United States Patent
Zhang

(10) Patent No.: US 12,213,010 B2
(45) Date of Patent: Jan. 28, 2025

(54) METHOD AND DEVICE IN COMMUNICATION NODE USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 692 days.

(21) Appl. No.: 17/179,407

(22) Filed: Feb. 19, 2021

(65) Prior Publication Data

US 2021/0219189 A1    Jul. 15, 2021

Related U.S. Application Data

(63) Continuation of application No. PCT/CN2020/140718, filed on Dec. 29, 2020.

(30) Foreign Application Priority Data

Jan. 10, 2020    (CN) .......................... 202010024740.4

(51) Int. Cl.
| | |
|---|---|
| H04W 36/00 | (2009.01) |
| H04W 36/08 | (2009.01) |
| H04W 36/30 | (2009.01) |

(52) U.S. Cl.
CPC ...... H04W 36/0016 (2013.01); *H04W 36/083* (2023.05); *H04W 36/302* (2023.05)

(58) Field of Classification Search
CPC ....... H04W 36/0016; H04W 36/00835; H04W 36/08; H04W 36/30; H04W 36/0061
See application file for complete search history.

(56) References Cited

U.S. PATENT DOCUMENTS

| | | | |
|---|---|---|---|
| 2016/0262137 A1* | 9/2016 | Behravan | .......... H04W 72/1263 |
| 2021/0288762 A1* | 9/2021 | Kazmi | ................. H04L 1/1887 |

FOREIGN PATENT DOCUMENTS

| | | |
|---|---|---|
| CN | 101064944 A | 10/2007 |
| CN | 101087447 A | 12/2007 |

(Continued)

OTHER PUBLICATIONS

3rd Generation Partnership Project;Technical Specification Group Radio Access Network; Solutions for NR to supportnon-terrestrial networks (NTN) (Release Y16) 11 ,3GPP Draft; Draft RP-193062 38821-110, 3rdGeneration Partnership Project (3GPP) ,Mobile Competence Centre ; 650 , Route DesLucioles ; F-06921 Sophia-Antipolis Cedex; France Dec. 6, 2019 (Dec. 6, 2019).

(Continued)

*Primary Examiner* — Mazda Sabouri

(57) ABSTRACT

A method and a device in a communication node for wireless communications are disclosed in the present disclosure. A communication node receives a first signal and a second signal; and transmits a third signal; the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell. The present disclosure herein proposes a scheme for cell handover, which allows partial system information to be updated as the UE moves in a cell group, thereby reducing signaling overhead.

17 Claims, 5 Drawing Sheets

(56) References Cited

FOREIGN PATENT DOCUMENTS

| CN | 106664633 | A  | 5/2017  |
|----|-----------|----|---------|
| CN | 107786944 | A  | 3/2018  |
| CN | 109792610 | A  | 5/2019  |
| EP | 2926592   | A1 | 10/2015 |
| EP | 3522585   | A1 | 8/2019  |

OTHER PUBLICATIONS

3rd Generation Partnership Project;Technical Specification Group Services and System Aspects; Study on architectureaspects for using satellite access in 5G(Release 17) 11 ,3GPP Standard; Technical Report; 3GPP TR23.737 , 3rd Generation Partnership Project (3GPP) , Mobile Competence Centre ; 650, Route Des Lucioles ; F-06921SOPHIA-Antipolis Cedex ; France vol. SA WG2 , No. V17.0.022 Dec. 2019 (Dec. 22, 2019.

"3rd Generation Partnership Project;Technical Specification Group Radio Access Network; NR; NR and NG-RAN Over'all A Description; Stage 2 (Release 16)" ,3GPP Standard; Technical Specification;3GPP TS 38.300 , 3rd Generation PartnershipProject (3GPP) , Mobile Competence Centre ;650 , Route Des Lucioles ; F-06921Sophia-Antipolis Cedex ; France vol. RAN WG2 , No. V16.0.0 Jan. 8, 2020 (Jan. 8, 2020).

"3rd Generation Partnership Project; Technical Specification Group Radio Access Network; NR; Radi 0 Resource Contro 1 (RRC)protocol specification (Release 15)" , 3GPP Standard; Technical Specification;3GPP TS 38.331 , 3rd Generation Partnership Project (3GPP) , Mobile Competence Centre ;650 , Route Des Lucioles ; F-06921 Sophia-Antipolis Cedex ; France vol. RAN WG2 , No. V15.8.08 Jan. 8, 2020 (Jan. 8, 2020).

ISR received in application No. PCT/CN2020/140718 dated Apr. 20, 2021.
CN202010024740.4 1st Office Action dated Dec. 2, 2021.
CN202010024740.4 First Search Report dated Nov. 25, 2021.
CN202010024740.4 1Second Office Action dated Mar. 14, 2022.
CN202010024740.4Second Search Report dated Nov. 25, 2021.

\* cited by examiner

```
-- ASN1START
-- TAG- fourth signal -START
fourth signal ::= SEQUENCE {
...
first information set
...
}
-- TAG- fourth signal -STOP
-- ASN1STOP
```

```
-- ASN1START
-- TAG- fifth signal -START
fifth signal ::= SEQUENCE {
...
second information set
...
}
-- TAG- fifth signal -STOP
-- ASN1STOP
```

METHOD AND DEVICE IN COMMUNICATION NODE USED FOR WIRELESS COMMUNICATION

CROSS REFERENCE TO RELATED APPLICATIONS

This application is a continuation of International Application No. PCT/CN2020/140718, filed Dec. 29, 2020, claims the priority benefit of Chinese Patent Application No. 202010024740.4, filed on Jan. 10, 2020, the full disclosure of which is incorporated herein by reference.

TECHNICAL FIELD

The present disclosure relates to transmission methods and devices in wireless communication systems, and in particular to a method and device of transmission with large delay.

BACKGROUND

In a traditional Cell Handover (HO) process, when a User Equipment (UE) is in a Radio Resource Control_Connected (RRC_Connected) State, a Base Station (BS) is capable of determining whether to hand over the UE from a Source Cell to a Target Cell based on a UE Measurement Result. The HO includes phases of Handover Preparation, Handover Execution and Handover Completion. Following the completion of a Cell HO process the UE is required to receive System Information (SI) of the Target Cell for updating. With communication requests becoming more and more challenging, the 3rd Generation Partner Project (3GPP) have begun studies over Non-Terrestrial Network (NTN) communications, and it was decided at the 3GPP RAN #80 Plenary that a Study Item (SI) of NewRadio (NR)-supported NTN solutions, a continuation of the previous SI of NR-supported NTN (RP-171450). In this new SI, the mobility of NTN is of primary importance.

SUMMARY

Transmission delay in an NTN is far larger than in a Terrestrial Network (TN). When a UE is handed over from a source NTN base station to a target TN base station, it has to execute several times of signaling interactions between the NTN and the TN, and along with each signaling interaction there will be tremendous delay. In an NTN environment, even if the UE is static on the ground, it will experience handovers due to mobility of an NTN base station, especially a fast-moving Low Earth Orbiting (LEO) relative to the earth, which probably results in frequent handovers of a UE it serves. Since the NTN base station has a large coverage, taking an area covered by the NTN as a cell will reduce the split gain of the cell; if an NTN beam is seen as a cell, the UE will be handed over too frequently even covered by a same satellite. Therefore, for a satellite base station, considerations are to be made to reach a compromise between guaranteeing cell split gain and reducing frequent HOs.

To address the above problem, the present disclosure provides a solution. It should be noted that though the present disclosure only took the NTN scenario for example in the statement above, it is also applicable to other scenarios such as terrestrial transmissions where similar technical effect can be achieved; additionally, the adoption of a unified solution for various scenarios contributes to the reduction of hardcore complexity and costs.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
receiving a first signal and a second signal; and
transmitting a third signal;
herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, a problem to be solved in the present disclosure includes: handovers will occur frequently as a base station moves, even if a UE remains static.

In one embodiment, a problem to be solved in the present disclosure includes: frequent handovers during mobility of a UE will lead to frequent updates of system information.

In one embodiment, characteristics of the above method include that multiple cells form a virtual cell, with each cell sharing a same virtual cell identity.

In one embodiment, characteristics of the above method include that multiple cells fall into different groups, with each cell carrying a grouping identity.

In one embodiment, characteristics of the above method include that multiple cells fall into different groups, with each cell identified by two-layer identities, the first being a cell-specific identity, and the second being a cell-grouping identity.

In one embodiment, characteristics of the above method include that the cell refers to abeam.

In one embodiment, characteristics of the above method include that the multiple cells cover a same geographic region.

In one embodiment, advantages of the above method include that the K1 cells in the first cell group share the third identity, so when the K1 cells are moving in the first cell group, there is no need for updating information specific to the first cell group, thus reducing handovers and signaling overhead incurred.

According to one aspect of the present disclosure, the above method is characterized in that the first identity and the second identity are respectively used for generating the first signal and the second signal.

According to one aspect of the present disclosure, the above method is characterized in that:
receiving a fourth signal;
herein, the fourth signal comprises a first information set, and the fourth signal is a broadcast signal, and the first information set remains unchanged during a handover of the first node from the first cell to the second cell.

In one embodiment, characteristics of the above method include that the first information set in system information is specific to the first cell group.

In one embodiment, advantages of the above method include that when the first node moves within coverage of the first cell group, it only needs to receive system information in the first information set, thus reducing signaling overhead.

According to one aspect of the present disclosure, the above method is characterized in that:

receiving a fifth signal;

herein, the fifth signal comprises a second information set, and the fifth signal is a broadcast signal, and the second information set only takes effect after the first node is handed over to the second cell.

In one embodiment, characteristics of the above method include that the second information set in system information is specific to the second cell.

In one embodiment, advantages of the above method include that only when the first node moves to the second cell will the system information in the second information set be used, thus reducing signaling overhead.

According to one aspect of the present disclosure, the above method is characterized in that the first signal and the second signal both comprise the third identity.

According to one aspect of the present disclosure, the above method is characterized in that:

transmitting a sixth signal when a first condition is fulfilled;

herein, a relation between the second identity and the third identity is used for determining the first condition; the sixth signal is used for requesting acquisition of system information of the second cell; the system information comprises the second information set.

According to one aspect of the present disclosure, the above method is characterized in that when moving in the first cell group, the first node is in connection to a second node; the K1 cells in the first cell group are generated by the second node.

The present disclosure provides a method in a second node for wireless communications, comprising:

transmitting a first signal and a second signal; and receiving a third signal;

herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

According to one aspect of the present disclosure, the above method is characterized in that the first identity and the second identity are respectively used for generating the first signal and the second signal.

According to one aspect of the present disclosure, the above method is characterized in that:

transmitting a fourth signal;

herein, the fourth signal comprises a first information set, and the fourth signal is a broadcast signal, and the first information set remains unchanged during a handover of the first node from the first cell to the second cell.

According to one aspect of the present disclosure, the above method is characterized in that:

transmitting a fifth signal;

herein, the fifth signal comprises a second information set, and the fifth signal is a broadcast signal, and the second information set only takes effect after the first node is handed over to the second cell.

According to one aspect of the present disclosure, the above method is characterized in that the first signal and the second signal both comprise the third identity.

According to one aspect of the present disclosure, the above method is characterized in receiving a sixth signal when a first condition is fulfilled;

herein, a relation between the second identity and the third identity is used for determining the first condition; the sixth signal is used for requesting acquisition of system information of the second cell; the system information comprises the second information set.

According to one aspect of the present disclosure, the above method is characterized in that when moving in the first cell group, a receiver of the first signal is in connection to the second node; the K1 cells in the first cell group are generated by the second node.

The present disclosure provides a first node for wireless communications, comprising:

a first receiver, receiving a first signal and a second signal; and a first transmitter, transmitting a third signal;

herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

The present disclosure provides a second node for wireless communications, comprising:

a second transmitter, transmitting a first signal;

a third transmitter, transmitting a second signal; and a second receiver, receiving a third signal;

herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the present disclosure is advantageous over conventional schemes in the following aspects:

Since an NTN is of larger delay than a TN, when a UE goes through a handover from a source NTN base station to a target TN base station, it has to execute multiple times of signaling interactions between the NTN and the TN, and each time there will be great delay caused. In the scheme proposed in the present disclosure, multiple cells form a cell group, with each cell featured by its own cell identity and assigned a cell group identity, so that when the UE moves between cells identified with the same cell group identity, only part of system information will need to be updated, thereby cutting the UE's signaling overhead and offering better support to UE mobility.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
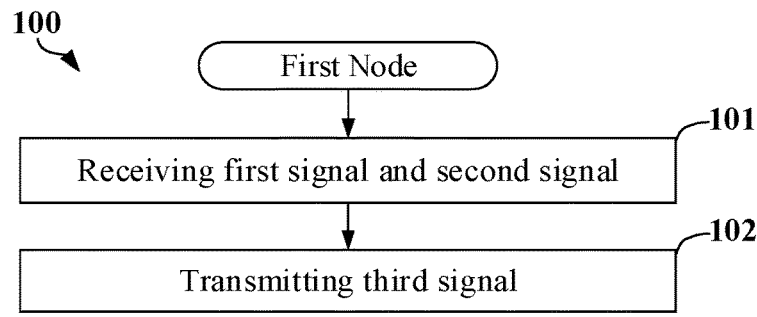
FIG. 1 illustrates a flowchart of transmissions of a first signal, a second signal and a third signal according to one embodiment of the present disclosure.

Embodiment 1 illustrates a flowchart of transmissions of a first signal, a second signal and a third signal according to one embodiment of the present disclosure, as shown in FIG. 1. In FIG. 1, each box represents a step. It is particularly underlined that the order in which the boxes are arranged does not imply a chronological sequence of each step respectively marked.

In Embodiment 1, the first node in the present disclosure receives a first signal and a second signal in step 101; transmits the third signal in step 102; herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the first signal is transmitted through an antenna port.

In one embodiment, the first signal is transmitted via an air interface.

In one embodiment, the first signal is transmitted through a broadcast channel.

In one embodiment, the first signal is transmitted through a Physical Broadcast Channel (PBCH).

In one embodiment, the first signal is a radio signal.

In one embodiment, the first signal is a Baseband signal.

In one embodiment, the first signal is a Physical Layer Signal.

In one embodiment, the first signal is a Reference Signal (RS).

In one embodiment, the first signal comprises a Primary Synchronization Signal (PSS).

In one embodiment, the first signal comprises a Secondary Synchronization Signal (SSS).

In one embodiment, the first signal comprises cell-specific reference signals (CRS).

In one embodiment, the first signal comprises a Channel-State Information Reference Signal (CSI-RS).

In one embodiment, the first signal comprises a synchronization signal and pbch block (SSB).

In one embodiment, the second signal is transmitted through an antenna port.

In one embodiment, the second signal is transmitted via an air interface.

In one embodiment, the second signal is transmitted through a broadcast channel.

In one embodiment, the second signal is transmitted through a Physical Broadcast Channel (PBCH).

In one embodiment, the second signal is a radio signal.

In one embodiment, the second signal is a Baseband signal.

In one embodiment, the second signal is a Physical Layer Signal.

In one embodiment, the second signal is a Reference Signal (RS).

In one embodiment, the second signal comprises a Primary Synchronization Signal (PSS).

In one embodiment, the second signal comprises a Secondary Synchronization Signal (SSS).

In one embodiment, the second signal comprises cell-specific reference signals (CRS).

In one embodiment, the second signal comprises a Channel-State Information Reference Signal (CSI-RS).

In one embodiment, the second signal comprises a synchronization signal and pbch block (SSB).

In one embodiment, the first identity is used for uniquely identifying one cell in the first cell group.

In one embodiment, the first identity is used for uniquely identifying one cell in a PLMN.

In one embodiment, the first identity is used for identifying different beams of a same base station.

In one embodiment, the first identity comprises a Beam Index.

In one embodiment, the first identity comprises a Cell Identity.

In one embodiment, the first identity comprises a Physical Cell Identity (PCI).

In one embodiment, the first identity comprises an Evolved Cell Global Identifier (ECGI).

In one embodiment, the first identity comprises a Public Land Mobile Network (PLMN).

In one embodiment, the first identity is obtained through a PSS and an SSS.

In one embodiment, the first identity comprises a Bit String.

In one embodiment, the first identity is identified by L1 bit(s), L1 being a positive integer.

In one embodiment, the second identity is used for uniquely identifying one cell in the first cell group.

In one embodiment, the second identity is used for uniquely identifying one cell in a PLMN.

In one embodiment, the second identity is used for identifying different beams of a same base station.

In one embodiment, the second identity comprises a Beam Index.

In one embodiment, the second identity comprises a Cell Identity.

In one embodiment, the second identity comprises a Physical Cell Identity (PCI).

In one embodiment, the second identity comprises an Evolved Cell Global Identifier (ECGI).

In one embodiment, the second identity comprises a Public Land Mobile Network (PLMN).

In one embodiment, the second identity is obtained through a PSS and an SSS.

In one embodiment, the second identity comprises a Bit String.

In one embodiment, the second identity is identified by L1 bit(s), L1 being a positive integer.

In one embodiment, the second identity and the first identity have different sequences.

In one embodiment, the third identity is used for identifying a group of cells.

In one embodiment, the third identity comprises a Cell Group Identity.

In one embodiment, the third identity comprises a Beam Group Identity.

In one embodiment, the third identity comprises a Bit String.

In one embodiment, the third identity is identified by L2 bit(s), L2 being a positive integer.

In one embodiment, the third signal comprises a Random Access (RA) signal.

In one embodiment, the third signal comprises a Preamble sequence.

In one embodiment, the third signal comprises a first sub-signal and a second sub-signal.

In one subembodiment, the first sub-signal comprises a Preamble sequence.

In one subembodiment, the second sub-signal comprises a payload.

In one embodiment, the third signal comprises a Radio Resource Control (RRC) signaling.

In one embodiment, the third signal comprises an RRC Connection Request message.

In one embodiment, the third signal comprises an RRC Early Data Request message.

In one embodiment, the third signal comprises an RRC Connection Resume message.

In one embodiment, the third signal comprises an RRC-ConnectionRequest Information Element (IE).

In one embodiment, the third signal comprises an RRC-ConnectionResumeRequest IE.

In one embodiment, the third signal comprises an RRCEarlyDataRequest IE.

In one embodiment, the first cell is a Physical Cell.

In one embodiment, the first cell is a Beam.

In one embodiment, the first cell is a cell of an NTN base station.

In one embodiment, the first cell is a beam of an NTN base station.

In one embodiment, the first cell is a cell of a TN base station.

In one embodiment, the first cell is a beam of a TN base station.

In one embodiment, the first cell is a source cell of the first node.

In one embodiment, the second cell is a Physical Cell.

In one embodiment, the second cell is a Beam.

In one embodiment, the second cell is a cell of an NTN base station.

In one embodiment, the second cell is a beam of an NTN base station.

In one embodiment, the second cell is a cell of a TN base station.

In one embodiment, the second cell is a beam of a TN base station.

In one embodiment, the second cell is a target cell of the first node.

In one embodiment, the first cell group comprises a group of cells.

In one embodiment, the first cell group comprises a group of Beams.

In one embodiment, the first cell group is a Virtual Cell.

In one embodiment, the first cell group is a Cell Group.

In one embodiment, the determination of the first cell group depends on network implementation.

In one subembodiment, the first cell group is divided according to geographic positions.

In one subembodiment, the first cell group is divided according to numbers of cells.

In one embodiment, the K1 cells in the first cell group respectively correspond to K1 beams.

In one embodiment, the K1 cells in the first cell group are of different coverages.

In one embodiment, the K1 cells in the first cell group share a same coverage.

In one embodiment, the K1 cells in the first cell group are continuously distributed geographically.

In one subembodiment, the phrase that the K1 cells in the first cell group are continuous has the meaning that coverages of the K1 cells are continuous.

In one embodiment, the K1 cells in the first cell group are not continuously distributed geographically.

In one subembodiment, the phrase that the K1 cells in the first cell group are not continuous has the meaning that coverages of the K1 cells are non-continuous.

In one embodiment, K1 is a positive integer.

In one embodiment, K1 is configurable.

In one embodiment, K1 is pre-configured.

In one embodiment, K1 is fixed.

In one embodiment, the cell in the present disclosure refers to beam.

In one embodiment, the cell in the present disclosure refers to physical cell.

Embodiment 2

Figure 2:
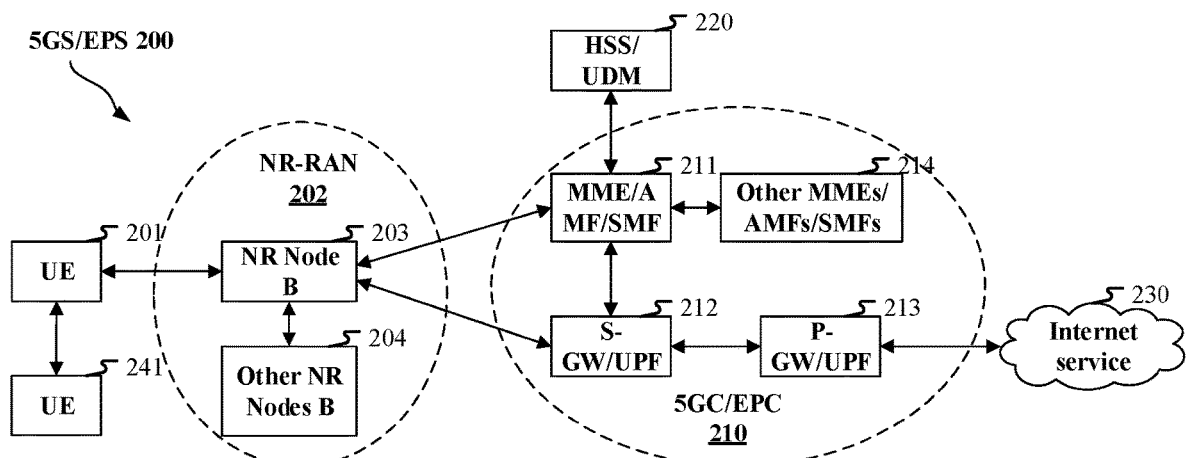
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G New Radio (NR), Long-Term Evolution (LTE), and Long-Term Evolution Advanced (LTE-A) systems. The 5G NR or LTE network architecture 200 may be called a 5G System (5GS)/Evolved Packet System (EPS) or some appropriate term. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, communication units in automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212; the S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching streaming Services.

In one embodiment, the UE 201 corresponds to the first node in the present disclosure.

In one embodiment, the UE 201 supports NTN communications.

In one embodiment, the UE 201 supports communications within networks with large delay difference.

In one embodiment, the UE 201 supports TN communications.

In one embodiment, the UE 201 is a UE.

In one embodiment, the UE 201 is an End Device.

In one embodiment, the UE 201 is a Vehicle-mounted device.

In one embodiment, the UE 201 is an End Device of Internet of Things (IoT).

In one embodiment, the gNB203 corresponds to the second node in the present disclosure.

In one embodiment, the gNB203 supports NTN communications.

In one embodiment, the gNB203 supports communications within networks with large delay difference.

In one embodiment, the gNB203 is a base station.

In one embodiment, the gNB203 is a satellite.

In one embodiment, the gNB203 is a flight platform.

In one embodiment, the gNB203 is an Unmanned Aerial Vehicle (UAV).

In one embodiment, the gNB203 supports TN communications.

In one embodiment, the gNB203 is a Marco Cellular base station.

In one embodiment, the gNB203 is a Micro Cell base station.

In one embodiment, the gNB203 is a Pico Cell base station.

In one embodiment, the gNB203 is a Femtocell.

Embodiment 3

Figure 3:
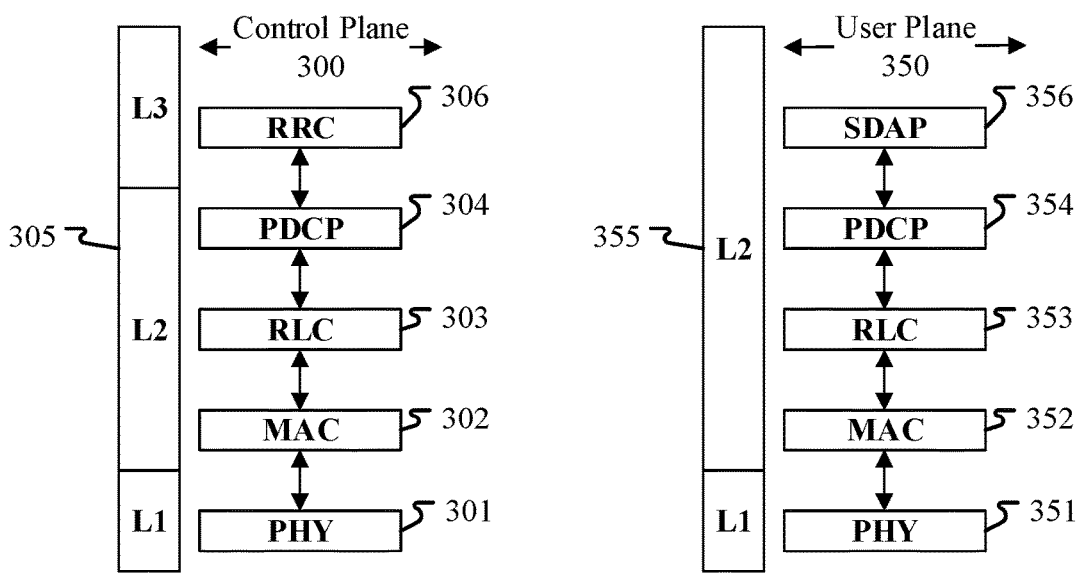
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, comprising a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for cross-cell handovers. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal in the present disclosure is generated by the PHY301 or the PHY351.

In one embodiment, the second signal in the present disclosure is generated by the PHY301 or the PHY351.

In one embodiment, the third signal in the present disclosure is generated by the RRC306.

In one embodiment, the third signal in the present disclosure is generated by the MAC302 or the MAC352.

In one embodiment, the third signal in the present disclosure is generated by the PHY301 or the PHY351.

In one embodiment, the fourth signal in the present disclosure is generated by the RRC306.

In one embodiment, the fourth signal in the present disclosure is generated by the MAC302 or the MAC352.

In one embodiment, the fourth signal in the present disclosure is generated by the PHY301 or the PHY351.

In one embodiment, the fifth signal in the present disclosure is generated by the RRC306.

In one embodiment, the fifth signal in the present disclosure is generated by the MAC302 or the MAC352.

In one embodiment, the fifth signal in the present disclosure is generated by the PHY301 or the PHY351.

In one embodiment, the sixth signal in the present disclosure is generated by the RRC306.

In one embodiment, the sixth signal in the present disclosure is generated by the MAC302 or the MAC352.

In one embodiment, the sixth signal in the present disclosure is generated by the PHY301 or the PHY351.

Embodiment 4

Figure 4:
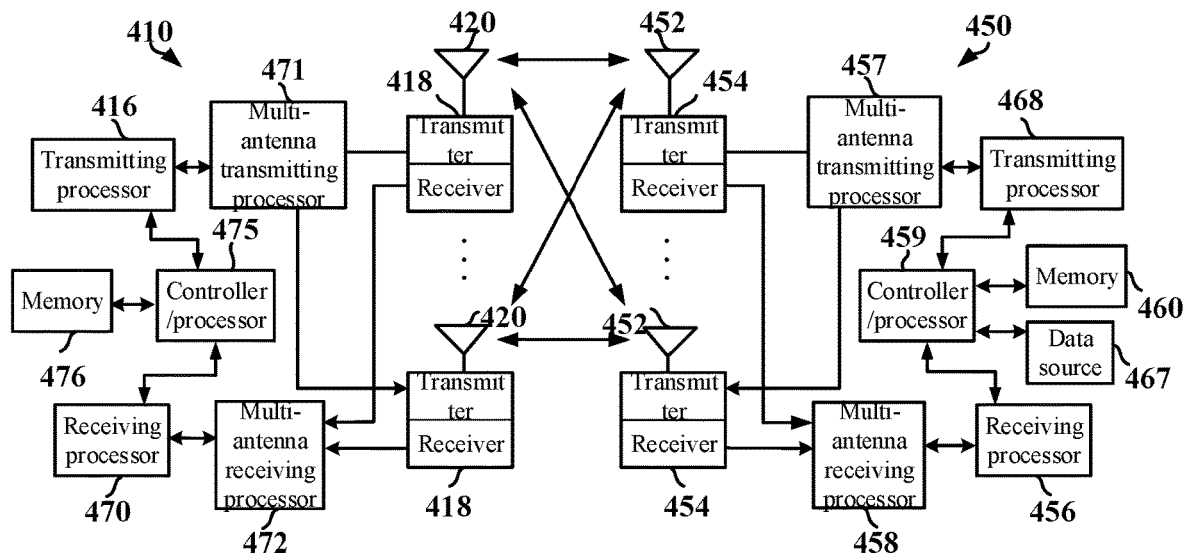
FIG. 4 illustrates a schematic diagram of a first communication device and a second communication device according to one embodiment of the present disclosure.
Figure 5:
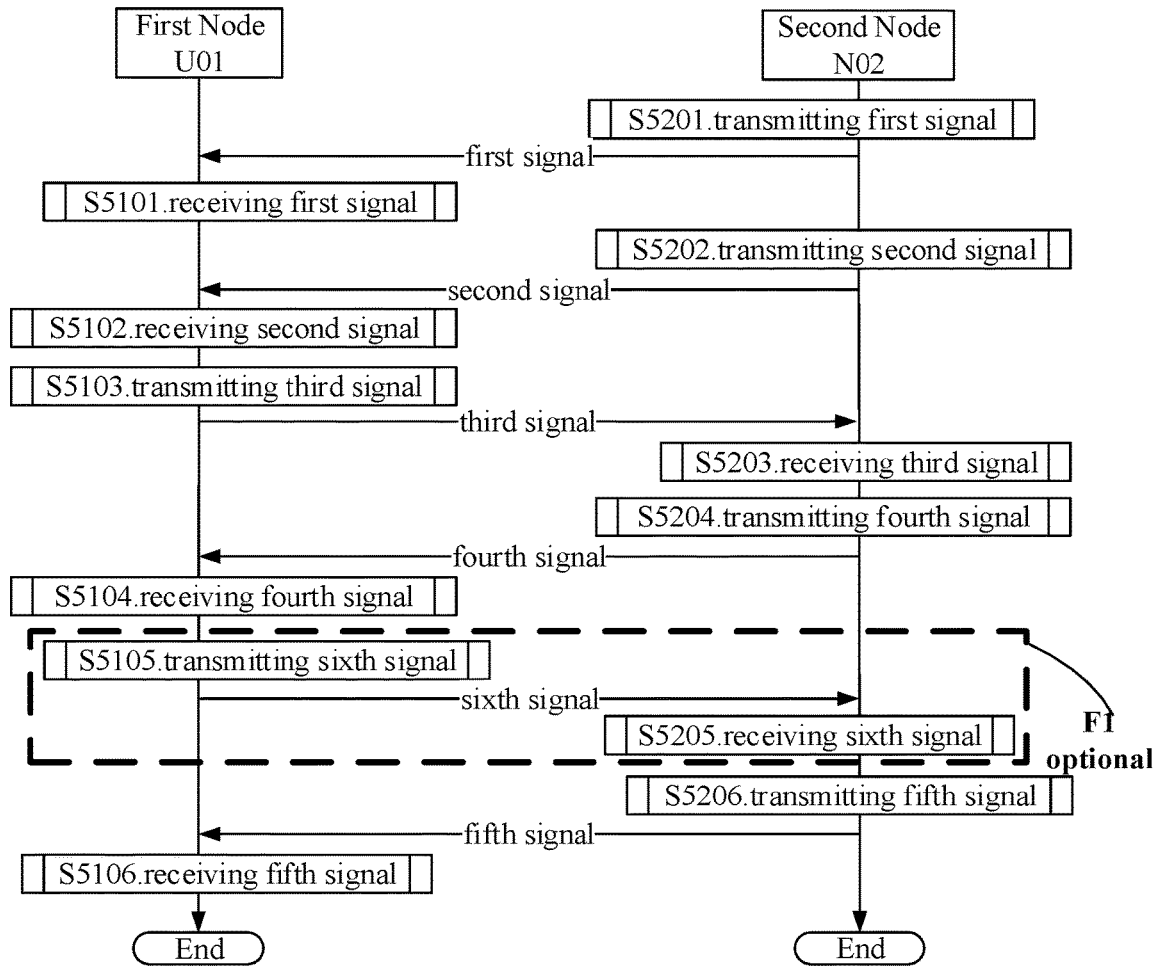
FIG. 5 illustrates a flowchart of radio signal transmission according to one embodiment of the present disclosure.

Embodiment 4 illustrates a schematic diagram of a first communication node and a second communication node, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

In a transmission from the second communication device 410 to the first communication device 450, at the second communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the second communication device 410 and the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the first communication device 450 and the second communication device 410, the controller/processor 475 provides de-multiplexing between a transport channel and a logical channel, packet reassembling, decrypting, header decompression, control signal processing so as to recover a higher-layer packet from the first communication device 450 (UE450). The higher-layer packet coming from the controller/processor 475 may be provided to the core network.

In one embodiment, the first communication device 450 comprises at least one processor and at least one memory. The at least one memory includes computer program codes. The at least one memory and the computer program codes are configured to be used in collaboration with the at least one processor. The first communication device 450 at least receives a first signal and a second signal; and transmits a third signal; herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the first communication device 450 comprises a memory that stores a computer readable instruction program. The computer readable instruction program generates actions when executed by at least one processor, which include: receiving a first signal and a second signal; and transmitting a third signal; herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits a first signal and a second signal; and receives a third signal; herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the second communication device 410 comprises a memory that stores a computer readable instruction program. The computer readable instruction program generates actions when executed by at least one processor, which include: transmitting a first signal and a second signal; and receiving a third signal; herein, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the antenna 452, the receiver 454, the receiving processor 456 and the controller/processor 459 are used for receiving a first signal and a second signal; at least one of the antenna 420, the transmitter 418, the transmitting processor 416 or the controller/processor 475 is used for transmitting a first signal and a second signal.

In one embodiment, the antenna 452, the transmitter 454, the transmitting processor 468 and the controller/processor 459 are used for transmitting a third signal; at least one of the antenna 420, the receiver 418, the receiving processor 470 or the controller/processor 475 is used for receiving a third signal.

In one embodiment, the antenna 452, the receiver 454, the receiving processor 456 and the controller/processor 459 are used for receiving a fourth signal and a fifth signal; at least one of the antenna 420, the transmitter 418, the transmitting processor 416 or the controller/processor 475 is used for transmitting a fourth signal and a fifth signal.

In one embodiment, the antenna 452, the transmitter 454, the transmitting processor 468 and the controller/processor 459 are used for transmitting a sixth signal; at least one of the antenna 420, the receiver 418, the receiving processor 470 or the controller/processor 475 is used for receiving a sixth signal.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is uncapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is abase station supporting NTN.

In one embodiment, the second communication device 410 is a satellite.

In one embodiment, the second communication device 410 is a flight platform.

In one embodiment, the second communication device 410 is a base station supporting TN.

Embodiment 5

Embodiment 5 illustrates a flowchart of radio signal transmission according to one embodiment of the present disclosure. A second node N02 is a base station corresponding to the first cell group; It is particularly underlined that the order illustrated in the Embodiment 5 does not put constraints over sequences of signal transmissions and implementations.

The first node U01 receives a first signal in step S5101, receives a second signal in step S5102, and transmits a third signal in step S5103, receives a fourth signal in step S5104, transmits a sixth signal in step S5105, and receives a fifth signal in step S5106.

The second node N02 transmits a first signal in step S5201, transmits a second signal in step S5202, and receives a third signal in step S5203, transmits a fourth signal in step S5204, receives a sixth signal in step S5205, and transmits a fifth signal in step S5206.

In Embodiment 5, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell; the first identity and the second identity are respectively used for generating the first signal and the second signal; the fourth signal comprises a first information set, and the fourth signal is a broadcast signal, and the first information set remains unchanged during a handover of the first node U01 from the first cell to the second cell; the fifth signal comprises a second information set, and the fifth signal is a broadcast signal, and the second information set only takes effect after the first node U01 is handed over to the second cell; the first signal and the second signal both comprise the third identity; when a first condition is fulfilled, the first transmitter transmits a sixth signal; a relation between the second identity and the third identity is used for determining the first condition; the sixth signal is used for requesting acquisition of system information of the second cell; the system information comprises the second information set; when moving in the first cell group, the first node U01 is in connection to a second node N02; the K1 cells in the first cell group are generated by the second node N02.

In one embodiment, the first cell refers to a Source Cell of the first node U01.

In one embodiment, the first cell refers to a serving cell of the first node U01.

In one embodiment, the first cell refers to a physical cell.

In one embodiment, the first cell refers to a Beam.

In one embodiment, the second cell refers to a Target Cell of the first node U01.

In one embodiment, the second cell refers to a physical cell.

In one embodiment, the second cell refers to a Beam.

In one embodiment, the first cell group refers to a group of cells.

In one embodiment, the first cell group refers to a group of beams.

In one embodiment, the first cell group is a Virtual Cell.

In one embodiment, the K1 cells in the first cell group respectively correspond to K1 beams.

In one embodiment, a channel carrying the first signal is a broadcast channel.

In one embodiment, a channel carrying the first signal is a Physical Broadcast Channel (PBCH).

In one embodiment, the first signal comprises a Physical Layer Signal.

In one embodiment, the first signal comprises a Primary Synchronization Signal (PSS).

In one embodiment, the first signal comprises a Secondary Synchronization Signal (SSS).

In one embodiment, a channel carrying the second signal is a broadcast channel.

In one embodiment, a channel carrying the second signal is a PBCH.

In one embodiment, the second signal comprises a Physical Layer Signal.

In one embodiment, the second signal comprises a Primary Synchronization Signal (PSS).

In one embodiment, the second signal comprises a Secondary Synchronization Signal (SSS).

In one embodiment, the first identity refers to a Beam Index.

In one embodiment, the first identity refers to a Cell Identity.

In one embodiment, the first identity refers to a Physical Cell Identity (PCI).

In one embodiment, the second identity refers to a Beam Index.

In one embodiment, the second identity refers to a Cell Identity.

In one embodiment, the second identity refers to a Physical Cell Identity (PCI).

In one embodiment, the third identity refers to a Cell Group Identity.

In one embodiment, the third identity refers to a Beam Group Identity.

In one embodiment, the third signal refers to a Random Access (RA) signal.

In one embodiment, the third signal refers to a Preamble sequence.

In one embodiment, the fourth signal is used for configuring parameters applicable to the whole first cell group.

In one embodiment, the fourth signal is a Radio Resource Control (RRC) Message.

In one embodiment, the fourth signal is one or more Information Elements (IEs) in an RRC Message.

In one embodiment, the fourth signal is all or part of an RRC Message.

In one embodiment, the fourth signal is one or more fields in an RRC Message.

In one embodiment, the fourth signal comprises common RRC messages.

In one embodiment, the fourth signal comprises all or part of System Information (SI).

In one embodiment, the fourth signal is all or part of a System Information Block (SIB).

In one embodiment, the fourth signal is all or part of a Master Information Block (MIB).

In one embodiment, the fourth signal is transmitted by a Physical broadcast channel (PBCH).

In one embodiment, the fourth signal is transmitted by a Broadcast Control Channel (BCCH).

In one embodiment, the fourth signal is transmitted periodically.

In one embodiment, the fourth signal is transmitted based on event-triggering mechanism.

In one embodiment, the fourth signal comprises the third identity.

In one embodiment, the fifth signal is used for configuring parameters specific to the second cell.

In one embodiment, the fifth signal is an RRC Message.

In one embodiment, the fifth signal is one or more Information Elements (IEs) in an RRC Message.

In one embodiment, the fifth signal is one or more fields in an RRC Message.

In one embodiment, the fifth signal is all or part of an RRC Message.

In one embodiment, the fifth signal comprises UE-specific RRC messages.

In one embodiment, the fifth signal is all or part of a piece of System Information (SI).

In one embodiment, the fifth signal is all or part of a System Information Block (SIB).

In one embodiment, the fifth signal is all or part of a Master Information Block (MIB).

In one embodiment, the fifth signal is transmitted by a PBCH.

In one embodiment, the fifth signal is a unicast signal.

In one embodiment, the fifth signal is transmitted periodically.

In one embodiment, the fifth signal is transmitted based on event-triggering mechanism.

In one embodiment, the fifth signal comprises the second identity.

In one embodiment, the sixth signal is an RRC Message.

In one embodiment, the sixth signal is one or more Information Elements (IEs) in an RRC Message.

In one embodiment, the sixth signal is one or more fields in an RRC Message.

In one embodiment, the sixth signal is all or part of an RRC Message.

In one embodiment, the sixth signal comprises the second identity.

In one embodiment, the sixth signal comprises the third identity.

In one embodiment, the phrase that the first identity and the second identity are respectively used for generating the first signal and the second signal includes the meaning that the first signal employs the first identity for scrambling, while the second signal employs the second identity for scrambling.

In one embodiment, the phrase that the first identity and the second identity are respectively used for generating the first signal and the second signal includes the meaning that the first signal implicitly indicates the first identity, while the second signal implicitly indicates the second identity.

In one embodiment, the phrase that the first identity and the second identity are respectively used for generating the first signal and the second signal includes the meaning that the first signal explicitly indicates the first identity, while the second signal explicitly indicates the second identity.

In one embodiment, the first signal comprises a first sub-signal and the second sub-signal; the first identity comprises a first sub-identity and a second sub-identity; herein, the first sub-identity is used for generating the first sub-signal, and the second sub-identity is used for generating the second sub-signal.

In one subembodiment, the first sub-signal is a PSS.

In one subembodiment, the second sub-signal is an SSS.

In one subembodiment, the first identity is an identity in a cell identity set; there are a total of 504 identities in the cell identity set.

In one subembodiment, the first sub-identity ranges from 0 to 167.

In one subembodiment, the second sub-identity ranges from 0 to 2.

In one subembodiment, the first sub-signal is obtained through operations of the first sub-identity and a first sequence; the first sequence is a Root Sequence.

In one subembodiment, the second sub-signal comprises two sequences, both of which are generated by the second sub-identity.

In one embodiment, the second signal comprises a third sub-signal and a fourth sub-signal; the second identity comprises a third sub-identity and a fourth sub-identity; herein, the third sub-identity is used for generating the third sub-signal, and the fourth sub-identity is used for generating the fourth sub-signal.

In one subembodiment, the third sub-signal is a PSS.

In one subembodiment, the fourth sub-signal is an SSS.

In one subembodiment, the second identity is an identity in a cell identity cell; there are a total of 504 identities in the cell identity set.

In one subembodiment, the third sub-identity ranges from 0 to 167.

In one subembodiment, the fourth sub-identity ranges from 0 to 2.

In one subembodiment, the third sub-signal is obtained through operations of the third sub-identity and a second sequence; the second sequence is a Root Sequence.

In one subembodiment, the fourth sub-signal comprises two sequences, both of which are generated by the fourth sub-identity.

In one embodiment, the phrase that when moving in the first cell group, the first node U01 is in connection to a second node N02 includes the meaning that a serving cell of the first node U01 is variable, but a maintenance base station for the serving cell stays the same.

In one embodiment, the phrase that the K1 cells in the first cell group are generated by the second node N02 includes the following meaning: a maintenance base station for each of the K1 cells is the second node N02.

In one embodiment, the phrase that the K1 cells in the first cell group are generated by the second node N02 includes the following meaning: the K1 cells are K1 beams of the second node N02.

In one embodiment, the first condition includes that the first node U01 detects the second identity of the second cell.

In one embodiment, the first condition includes that the first node U01 detects the second identity and the third identity of the second cell simultaneously.

In one embodiment, the first condition includes that the first node U01 detects that receiving quality of a reference signal of the second cell is greater than that of a reference signal of the first cell.

In one embodiment, the first condition includes that the first node U01 detects that receiving quality of a reference signal of the second cell is better than a first threshold.

In one subembodiment, the first threshold is configurable.

In one subembodiment, the first threshold is pre-configured.

In one subembodiment, the first threshold is fixed.

In one subembodiment, the receiving quality of the reference signal comprises a Reference Signal Received Power (RSRP) of the reference signal.

In one subembodiment, the receiving quality of the reference signal comprises a Reference Signal Received Quality (RSRQ) of the reference signal.

In one subembodiment, the receiving quality of the reference signal comprises a Received Signal Strength Indicator (RSSI) of the reference signal.

In one subembodiment, the receiving quality of the reference signal comprises a Signal to Noise and Interference Ratio (SINR) of the reference signal.

In one subembodiment, the receiving quality of the reference signal comprises a Channel Status Information reference signal resource indicator (CRI) of the reference signal.

In one embodiment, both the first cell and the second cell are associated with the second node N02.

In one embodiment, the first cell group is associated with the second node N02.

In one embodiment, the first cell and the second cell are associated with two different base stations.

In one embodiment, the second node N02 is an NTN base station.

In one subembodiment, the NTN base station comprises Airborne vehicles.

In one subembodiment, the NTN base station comprises High Altitude Platforms (HAPs).

In one subembodiment, the NTN base station comprises Unmanned Aircraft Systems (UAS).

In one subembodiment, the NTN base station comprises Lighter than Air (LTA) UAS.

In one subembodiment, the NTN base station comprises Heavier than Air (HTA) UAS.

In one subembodiment, the NTN base station comprises Spaceborne vehicles.

In one subembodiment, the NTN base station comprises Low Earth Orbiting (LEO).

In one subembodiment, the NTN base station comprises Medium Earth Orbiting (MEO).

In one subembodiment, the NTN base station comprises Highly Elliptical Orbiting (HEO).

In one subembodiment, the NTN base station comprises Geostationary Earth Orbiting (GEO).

In one embodiment, the second node N02 is a TN base station.

In one subembodiment, the TN base station is a Marco Cellular base station.

In one subembodiment, the TN base station is a Micro Cell base station.

In one subembodiment, the TN base station is a Pico Cell base station.

In one subembodiment, the TN base station is a Femto-cell.

In one embodiment, the broken-line framed box F1 exists.

In one embodiment, the broken-line framed box F1 does not exist.

Embodiment 6

Figure 6:
FIG. 6 illustrates a schematic diagram of a fourth signal comprising a first information set according to one embodiment of the present disclosure.

Embodiment 6 illustrates a schematic diagram of a fourth signal comprising a first information set according to one embodiment of the present disclosure, as shown in FIG. 6.

In Embodiment 6, the fourth signal comprises a first information set, and the fourth signal is a broadcast signal, and the first information set remains unchanged during a handover of the first node from the first cell to the second cell.

In one embodiment, the phrase that the first information set remains unchanged during a handover of the first node from the first cell to the second cell includes the meaning that the first cell and the second cell share configurations in the first information set.

In one embodiment, the phrase that the first information set remains unchanged during a handover of the first node from the first cell to the second cell includes the meaning that the first information set is related to both configurations of the first cell and the second cell.

In one embodiment, the phrase that the first information set remains unchanged during a handover of the first node from the first cell to the second cell includes the meaning that configurations in the first information set are employed by both the first cell and the second cell.

In one embodiment, the phrase that the first information set remains unchanged during a handover of the first node from the first cell to the second cell includes the meaning that the first information set is effective in the first cell group.

In one embodiment, the phrase that the first information set remains unchanged during a handover of the first node from the first cell to the second cell includes the meaning that configurations in the first information set are employed as the first node moves in the first cell group.

In one embodiment, the phrase that the first information set remains unchanged during a handover of the first node from the first cell to the second cell includes the meaning that if no change happens to the third identity of the first node, the first node employs configuration information in the first information set.

In one embodiment, the fourth signal comprises common RRC messages.

In one embodiment, the fourth signal comprises all or part of a System Information Block (SIB).

In one embodiment, the fourth signal comprises an RRC configuration message.

In one embodiment, the phrase that the fourth signal comprises a first information set includes the meaning that the first information set is all or part of the fourth signal.

In one embodiment, the phrase that the fourth signal comprises a first information set includes the meaning that the first information set is one or more IEs in the fourth signal.

In one embodiment, the first information set is one or more IEs in the fourth signal.

In one embodiment, the first information set is all or part of the fourth signal.

In one embodiment, the first information set is a struct of the fourth signal.

In one embodiment, the first information set comprises New Radio (NR) system information configurations.

In one embodiment, the first information set comprises Long Term Evolution (LTE) system information configurations.

In one embodiment, the first information set comprises Cell Access configuration information.

In one embodiment, the first information set comprises Cell Selection configuration information.

In one embodiment, the first information set comprises Cell Reselection configuration information.

In one embodiment, the first information set comprises Measurement Configuration information.

In one embodiment, the first information set comprises Measurement Report Configuration information.

In one embodiment, the first information set comprises Random Access (RA) configuration information.

In one embodiment, the first information set comprises Tracking Area (TA) configuration information.

In one embodiment, the first information set comprises configuration information of Common Search Space.

In one embodiment, the first information set comprises the third identity.

In one embodiment, the first information set comprises an IE in an RRC Message in TS 36.331.

In one embodiment, the first information set comprises an IE in an RRC Message in TS 38.331.

In one embodiment, the first information set comprises one or more fields in a SIB2 IE in TS 38.331.

In one embodiment, the first information set comprises one or more fields in a SIB3 IE in TS 38.331.

In one embodiment, the first information set comprises one or more fields in a SIB4 IE in TS 38.331.

In one embodiment, the first information set comprises one or more fields in a SIB5 IE in TS 38.331.

In one embodiment, the first information set comprises one or more fields in a BWP-DownlinkCommon IE in TS 38.331.

In one embodiment, the first information set comprises one or more fields in a BWP-UplinkCommon IE in TS 38.331.

In one embodiment, the first information set comprises one or more fields in a DownlinkConfigCommon IE in TS 38.331.

In one embodiment, the first information set comprises one or more fields in a DownlinkConfigCommonSIB IE in TS 38.331.

In one embodiment, the first information set comprises one or more fields in a PDSCH-ConfigCommon IE in TS 38.331.

In one embodiment, the first information set comprises one or more fields in a PDCCH-ConfigCommon IE in TS 38.331.

In one embodiment, the first information set comprises one or more fields in a PUCCH-ConfigCommon IE in TS 38.331.

In one embodiment, the first information set comprises one or more fields in a PUSCH-ConfigCommon IE in TS 38.331.

In one embodiment, the first information set comprises one or more fields in a RACH-ConfigCommon IE in TS 38.331.

In one embodiment, the first information set comprises one or more fields in a ServingCellConfigCommon IE in TS 38.331.

In one embodiment, the first information set comprises one or more fields in an UplinkConfigCommon IE in TS 38.331.

In one embodiment, the first information set comprises one or more fields in an UplinkConfigCommonSIB IE in TS 38.331.

In one embodiment, the first information set comprises one or more fields in an Alpha IE in TS 38.331.

In one embodiment, the first information set comprises one or more fields in a BSR-Config IE in TS 38.331.

In one embodiment, the first information set comprises one or more fields in a CellAccessRelatedInfo IE in TS 38.331.

In one embodiment, the first information set comprises one or more fields in a CellIdentity IE in TS 38.331.

In one embodiment, the first information set comprises one or more fields in a CellReselectionPriority IE in TS 38.331.

In one embodiment, the first information set comprises one or more fields in a CSI-MeasConfig IE in TS 38.331.

In one embodiment, the first information set comprises one or more fields in a CSI-ReportConfig IE in TS 38.331.

In one embodiment, the first information set comprises one or more fields in a DMRS-UplinkConfig IE in TS 38.331.

In one embodiment, the first information set comprises one or more fields in a DRX-Config IE in TS 38.331.

In one embodiment, the first information set comprises one or more fields in a MeasConfig IE in TS 38.331.

In one embodiment, the first information set comprises one or more fields in a MeasGapConfig IE in TS 38.331.

In one embodiment, the first information set comprises one or more fields in a MeasGapSharingConfg IE in TS 38.331.

In one embodiment, the first information set comprises one or more fields in a MeasResults IE in TS 38.331.

In one embodiment, the first information set comprises one or more fields in a P-Max IE in TS 38.331.

In one embodiment, the first information set comprises one or more fields in a PCI-List IE in TS 38.331.

In one embodiment, the first information set comprises one or more fields in a PCI-Range IE in TS 38.331.

In one embodiment, the first information set comprises one or more fields in a PHR-Config IE in TS 38.331.

In one embodiment, the first information set comprises one or more fields in a PhysCellId IE in TS 38.331.

In one embodiment, the first information set comprises one or more fields in a PLMN-Identity IE in TS 38.331.

In one embodiment, the first information set comprises one or more fields in a PLMN-IdentityInfoList IE in TS 38.331.

In one embodiment, the first information set comprises one or more fields in a PUCCH-PathlossReferenceRS-Id IE in TS 38.331.

In one embodiment, the first information set comprises one or more fields in a Q-OffsetRange IE in TS 38.331.

In one embodiment, the first information set comprises one or more fields in a Q-QualMin IE in TS 38.331.

In one embodiment, the first information set comprises one or more fields in a Q-RxLevMin IE in TS 38.331.

In one embodiment, the first information set comprises one or more fields in a QuantityConfig IE in TS 38.331.

In one embodiment, the first information set comprises one or more fields in a RACH-ConfigDedicated IE in TS 38.331.

In one embodiment, the first information set comprises one or more fields in a RACH-ConfigGeneric IE in TS 38.331.

In one embodiment, the first information set comprises one or more fields in a RA-Prioritization IE in TS 38.331.

In one embodiment, the first information set comprises one or more fields in a ReselectionThreshold IE in TS 38.331.

In one embodiment, the first information set comprises one or more fields in a ReselectionThresholdQ IE in TS 38.331.

In one embodiment, the first information set comprises one or more fields in a SearchSpace IE in TS 38.331.

In one embodiment, the first information set comprises one or more fields in a SearchSpaceId IE in TS 38.331.

In one embodiment, the first information set comprises one or more fields in a SearchSpaceZero IE in TS 38.331.

In one embodiment, the first information set comprises one or more fields in a SchedulingRequestConfig IE in TS 38.331.

In one embodiment, the first information set comprises one or more fields in a ServingCellConfigCommonSIB IE in TS 38.331.

In one embodiment, the first information set comprises one or more fields in a TAG-Config IE in TS 38.331.

In one embodiment, the first information set comprises one or more fields in a TrackingAreaCode IE in TS 38.331.

In one embodiment, the first information set comprises one or more fields in a SystemInformationBlockType2 IE in TS 36.331.

In one embodiment, the first information set comprises one or more fields in a SystemInformationBlockType3 IE in TS 36.331.

In one embodiment, the first information set comprises one or more fields in a SystemInformationBlockType4 IE in TS 36.331.

In one embodiment, the first information set comprises one or more fields in a SystemInformationBlockType5 IE in TS 36.331.

In one embodiment, the first information set comprises a prach-Confg IE in TS 36.331.

In one embodiment, the first information set comprises a PRACH-ConfigSIB IE in TS 36.331.

Embodiment 7

Figure 7:
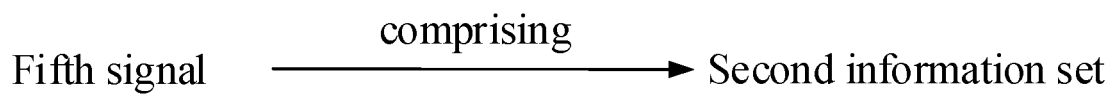
FIG. 7 illustrates a schematic diagram of a fifth signal comprising a second information set according to one embodiment of the present disclosure.

Embodiment 7 illustrates a schematic diagram of a fifth signal comprising a second information set according to one embodiment of the present disclosure, as shown in FIG. 7.

In Embodiment 7, the fifth signal comprises a second information set, and the fifth signal is a broadcast signal, and the second information set only takes effect after the first node is handed over to the second cell.

In one embodiment, the phrase that the second information set only takes effect after the first node is handed over to the second cell includes the meaning that the second information set is cell-specific.

In one embodiment, the phrase that the second information set only takes effect after the first node is handed over to the second cell includes the meaning that the second information set is related to configurations of the second cell, but unrelated to configurations of the first cell.

In one embodiment, the phrase that the second information set only takes effect after the first node is handed over to the second cell includes the meaning that when the first identity of the first node turns into the second identity, the first node employs configurations in the second information set.

In one embodiment, the phrase that the second information set only takes effect after the first node is handed over to the second cell includes the meaning that part of configuration information of the first node changes as the first node moves in the first cell group.

In one embodiment, the phrase that the second information set only takes effect after the first node is handed over to the second cell includes the meaning that part of configuration information of the first node changes along with a physical identity of the first node; the part of configuration information includes the second information set.

In one embodiment, the fifth signal is an RRC message.

In one embodiment, the fifth signal comprises common RRC messages.

In one embodiment, the fifth signal comprises all or part of a System Information Block (SIB).

In one embodiment, the second information set is one or more IEs in the fifth signal.

In one embodiment, the second information set is all or part of the fifth signal.

In one embodiment, the second information set is a struct of the fifth signal.

In one embodiment, the second information set comprises NR system information configurations.

In one embodiment, the second information set comprises LTE system information configurations.

In one embodiment, the second information set comprises power configuration information.

In one embodiment, the second information set comprises beam configuration information.

In one embodiment, the second information set comprises configuration information of a Transmission Configuration Indicator (TCI).

In one embodiment, the second information set comprises frequency configuration information.

In one embodiment, the second information set comprises Bandwidth Part (BWP) configuration information.

In one embodiment, the second information set comprises configuration information of control resource sets.

In one embodiment, the second information set comprises configuration information of CSI-RS.

In one embodiment, the second information set comprises the second identity.

In one embodiment, the second information set comprises the third identity.

In one embodiment, the second information set comprises an IE in an RRC message in TS 36.331.

In one embodiment, the second information set comprises an IE in an RRC message in TS 38.331.

In one embodiment, the second information set comprises one or more fields in a BWP IE in TS 38.331.

In one embodiment, the second information set comprises one or more fields in a BWP-DownlinkDedicated IE in TS 38.331.

In one embodiment, the second information set comprises one or more fields in a BWP-UplinkDedicated IE in TS 38.331.

In one embodiment, the second information set comprises one or more fields in a BWP-Downlink IE in TS 38.331.

In one embodiment, the second information set comprises one or more fields in a BWP-Id IE in TS 38.331.

In one embodiment, the second information set comprises one or more fields in a BWP-Uplink IE in TS 38.331.

In one embodiment, the second information set comprises one or more fields in a ConfiguredGrantConfg IE in TS 38.331.

In one embodiment, the second information set comprises one or more fields in a ControlResourceSet IE in TS 38.331.

In one embodiment, the second information set comprises one or more fields in a ControlResourceSetId IE in TS 38.331.

In one embodiment, the second information set comprises one or more fields in a ControlResourceSetZero IE in TS 38.331.

In one embodiment, the second information set comprises one or more fields in a CSI-ResourceConfig IE in TS 38.331.

In one embodiment, the second information set comprises one or more fields in a CSI-SSB-ResourceSet IE in TS 38.331.

In one embodiment, the second information set comprises one or more fields in a DMRS-DownlinkConfig IE in TS 38.331.

In one embodiment, the second information set comprises one or more fields in a TCI-State IE in TS 38.331.

In one embodiment, the second information set comprises one or more fields in a PDCCH-Config IE in TS 38.331.

In one embodiment, the second information set comprises one or more fields in a PDCCH-ConfigSIB1 IE in TS 38.331.

In one embodiment, the second information set comprises one or more fields in a PDCCH-ServingCellConfig IE in TS 38.331.

In one embodiment, the second information set comprises one or more fields in a PDSCH-Config IE in TS 38.331.

In one embodiment, the second information set comprises one or more fields in a PDSCH-ServingCellConfig IE in TS 38.331.

In one embodiment, the second information set comprises one or more fields in a PDSCH-TimeDomainResourceAllocationList IE in TS 38.331.

In one embodiment, the second information set comprises one or more fields in a PUCCH-Config IE in TS 38.331.

In one embodiment, the second information set comprises one or more fields in a PUCCH-PowerControl IE in TS 38.331.

In one embodiment, the second information set comprises one or more fields in a PUSCH-Config IE in TS 38.331.

In one embodiment, the second information set comprises one or more fields in a PUSCH-PowerControl IE in TS 38.331.

In one embodiment, the second information set comprises one or more fields in a PUSCH-ServingCellConfig IE in TS 38.331.

In one embodiment, the second information set comprises one or more fields in a LogicalChannelConfig IE in TS 38.331.

In one embodiment, the second information set comprises one or more fields in a LogicalChannelIdentity IE in TS 38.331.

In one embodiment, the second information set comprises one or more fields in a PUSCH-TimeDomainResourceAllocationList IE in TS 38.331.

In one embodiment, the second information set comprises one or more fields in a SchedulingRequestResourceConfig IE in TS 38.331.

In one embodiment, the second information set comprises one or more fields in a ServCellIndex IE in TS 38.331.

In one embodiment, the second information set comprises one or more fields in a ServingCellConfig IE in TS 38.331.

In one embodiment, the second information set comprises one or more fields in a CSI-RS-ResourceConfigMobility IE in TS 38.331.

In one embodiment, the second information set comprises one or more fields in a CSI-RS-ResourceMapping IE in TS 38.331.

In one embodiment, the second information set comprises one or more fields in an SRS-Config IE in TS 38.331.

Embodiment 8

Figure 8:
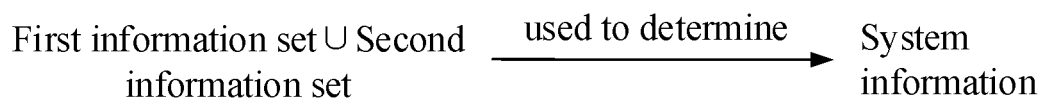
FIG. 8 illustrates a schematic diagram of a union of a first information set and a second information set being used for indicating system information according to one embodiment of the present disclosure.

Embodiment 8 illustrates a schematic diagram of a union of a first information set and a second information set being used for indicating system information according to one embodiment of the present disclosure, as shown in FIG. 8. In FIG. 8, the symbol U refers to a union.

In Embodiment 8, a union of the first information set and the second information set is used for determining complete system information.

In one embodiment, the system information is composed of the first information set and the second information set.

In one embodiment, the first information set and the second information set are both periodically transmitted.

In one embodiment, the first information set and the second information set have a same transmission period.

In one embodiment, the first information set and the second information set have different transmission periods.

In one embodiment, the first information set and the second information set are both transmitted based on event-triggering mechanism.

In one embodiment, the first information set is transmitted based on event-triggering mechanism, while the second information set is periodically transmitted.

In one embodiment, the first information set is periodically transmitted, while the second information set is transmitted based on event-triggering mechanism.

In one embodiment, the event-triggering refers to fulfilment of the first condition.

In one embodiment, the first information set is common system information, while the second information set is specific system information.

In one embodiment, the first information set and the second information set are orthogonal.

In one subembodiment, the phrase that the first information set and the second information set are orthogonal includes the meaning that there isn't any same Radio Resource Control (RRC) Information Element (IE) shared by the first information set and the second information set.

In one embodiment, the first information set and the second information set are not completely orthogonal.

In one subembodiment, the phrase that the first information set and the second information set are not completely orthogonal includes the meaning that the first information set and the second information set have a same RRC IE and also different RRC IEs.

Embodiment 9

Figure 9:
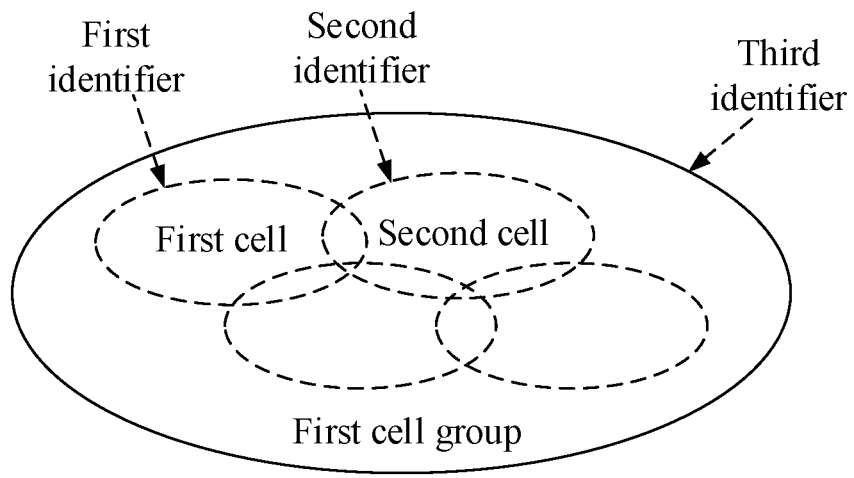
FIG. 9 illustrates a schematic diagram of relative relations of a first cell, a second cell and a first cell group according to one embodiment of the present disclosure.

Embodiment 9 illustrates a schematic diagram of relative relations of a first cell, a second cell and a first cell group according to one embodiment of the present disclosure, as shown in FIG. 9. In FIG. 9, the solid-curve framed ellipse represents a first cell group; the first cell group is identified by a third identity; the broken-curve framed ellipses represent multiple cells in the first cell group, of which the ellipse on the upper left represents a first cell, identified by the first identity; and the ellipse on the upper right represents a second cell, identified by the second identity.

In one embodiment, the first cell and the second cell are any two cells in the first cell group.

In one embodiment, the first cell and the second cell are adjacent cells.

In one embodiment, the first cell and the second cell are co-site.

In one embodiment, the first cell and the second cell are not co-site.

In one embodiment, the first cell and the second cell are two consecutive cells.

In one embodiment, the first cell and the second cell are two non-consecutive cells.

In one embodiment, the first cell and the second cell are orthogonal in coverage areas.

In one subembodiment, the word orthogonal refers to non-overlapped coverage.

In one embodiment, the first cell and the second cell are non-orthogonal in coverage areas.

In one subembodiment, the word non-orthogonal refers to completely overlapped coverage.

In one subembodiment, the word non-orthogonal refers to partially overlapped coverage.

In one embodiment, the first cell and the second cell are two different beams of a same base station.

In one embodiment, the first cell and the second cell are two different beams of two different base stations.

In one embodiment, the first cell and the second cell are two different cells of two different base stations.

In one embodiment, the first cell is an NTN cell, while the second cell is a TN cell.

In one embodiment, the first cell is an NTN cell, while the second cell is an NTN cell.

In one embodiment, the first cell is a TN cell, while the second cell is an NTN cell.

In one embodiment, the first cell is a TN cell, while the second cell is a TN cell.

In one embodiment, the first cell employs the first identity and the second identity for identifying.

In one embodiment, the second cell employs the second identity and the third identity for identifying.

In one embodiment, a first-layer identity of the first cell is the first identity, and a second-layer identity of the first cell is the third identity.

In one embodiment, a first-layer identity of the second cell is the second identity, and a second-layer identity of the second cell is the third identity.

Embodiment 10

Figure 10:
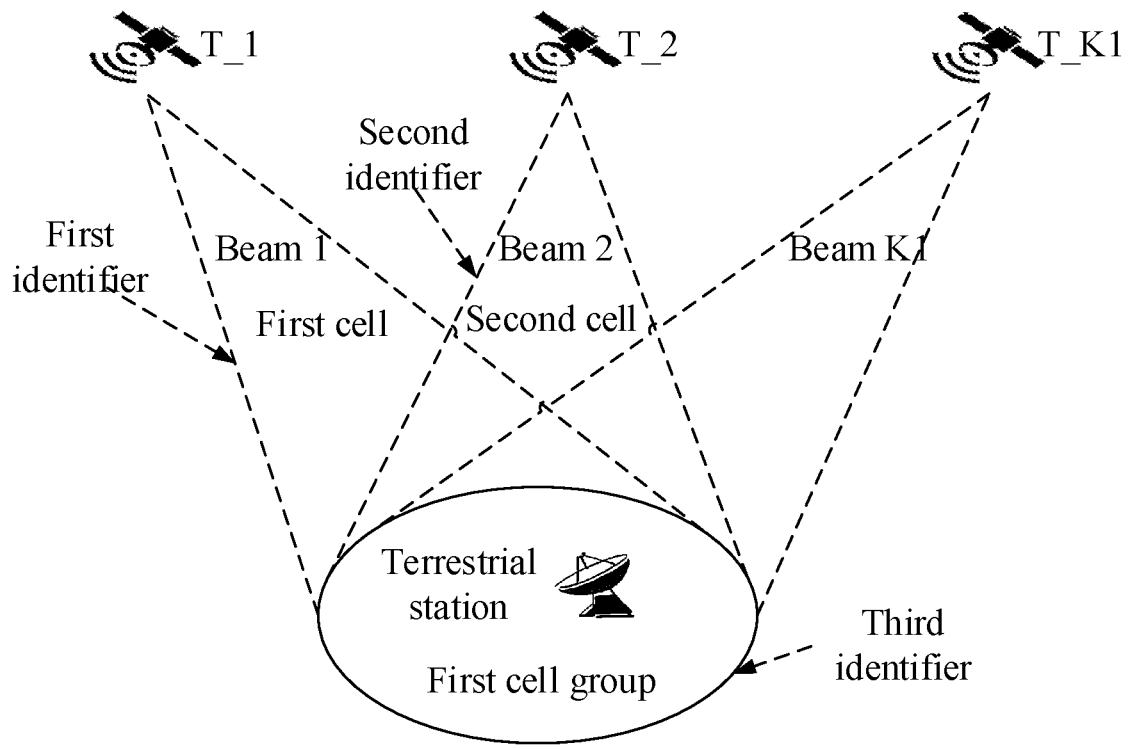
FIG. 10 illustrates a schematic diagram of relative relations of a first cell, a second cell and a first cell group according to another embodiment of the present disclosure.

Embodiment 10 illustrates a schematic diagram of relative relations of a first cell, a second cell and a first cell group according to another embodiment of the present disclosure, as shown in FIG. 10. In FIG. 10, the solid-curve framed ellipse represents a given area on the earth; as a satellite base station moves with the change of time, the given area is covered by different beams; assume that the satellite base station moves relative to the surface of the earth from the left to the right, and covers the given area with K1 beams respectively at T_1 instant, T_2 instant, . . . and T_K1 instant; beam 1 represents a beam of the satellite base station that covers the given area at the T_1 instant; beam 2 represents a beam of the satellite base station that covers the given area at the T_2 instant; and beam K1 represents a beam of the satellite base station that covers the given area at the T_K1 instant.

In one embodiment, the satellite base station corresponds to the K1 beams from the satellite base station covering the given area at different times.

In one embodiment, the black-edged ellipse represents the coverage of the first cell group.

In one embodiment, the beam 1 corresponds to the first cell, and the beam 2 corresponds to the second cell; the first cell identifies by a first identity, and the second cell identifies by a second identity.

In one embodiment, the third identity is related to where the satellite base station is located.

In one embodiment, the third identity is related to an ephemeris of the satellite base station.

In one embodiment, the first cell and the second cell belong to a same satellite base station.

In one embodiment, the first cell and the second cell belong to different satellite base stations.

In one embodiment, the terrestrial station exists; when the terrestrial station exists, the satellite base station is invisible to the UE, and is connected to the terrestrial station via Feederlink, UE being connected to the terrestrial station.

In one embodiment, the terrestrial station does not exist; when the terrestrial station does not exist, the satellite base station is in communication with the UE within the given area directly.

Embodiment 11

Figure 11:
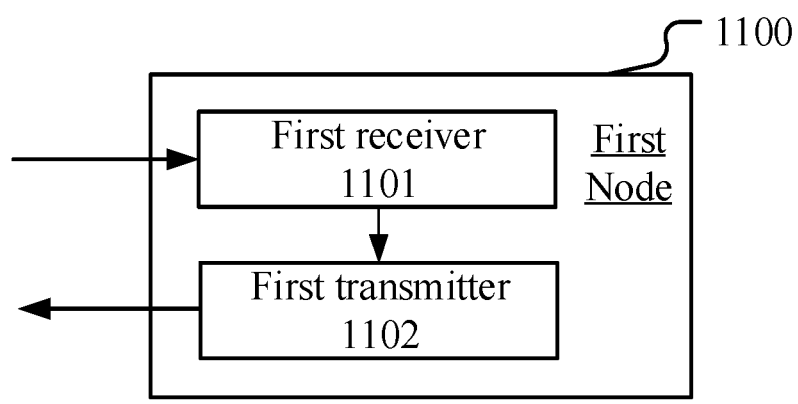
FIG. 11 illustrates a structure block diagram of a processing device in a first node according to one embodiment of the present disclosure.

Embodiment 11 illustrates a structure block diagram of a processing device in a first node according to one embodiment of the present disclosure; as shown in FIG. 11. In FIG. 11, a processing device 1100 in a first node comprises a first receiver 1101 and a first transmitter 1102.

The first receiver 1101 receives a first signal and a second signal.

The first transmitter 1102 transmits a third signal.

In Embodiment 11, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the first identity and the second identity are respectively used for generating the first signal and the second signal.

In one embodiment, the first receiver 1101 receives a fourth signal; herein, the fourth signal comprises a first information set, and the fourth signal is a broadcast signal, and the first information set remains unchanged during a handover of the first node from the first cell to the second cell.

In one embodiment, the first receiver 1101 receives a fifth signal; herein, the fifth signal comprises a second information set, and the fifth signal is a broadcast signal, and the second information set only takes effect after the first node is handed over to the second cell.

In one embodiment, the first signal and the second signal both comprise the third identity.

In one embodiment, when a first condition is fulfilled, the first transmitter 1102 transmits a sixth signal; herein, a relation between the second identity and the third identity is used for determining the first condition; the sixth signal is used for requesting acquisition of system information of the second cell; the system information comprises the second information set.

In one embodiment, when moving in the first cell group, the first node is in connection to a second node; the K1 cells in the first cell group are generated by the second node.

In one embodiment, the first receiver 1101 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises the antenna 452, the receiver 454, the multi-antenna receiving processor 458 and the receiving processor 456 in FIG. 4 of the present disclosure.

In one embodiment, the first receiver 1101 comprises the antenna 452, the receiver 454 and the receiving processor 456 in FIG. 4 of the present disclosure.

In one embodiment, the first transmitter 1102 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises the antenna 452, the transmitter 454, the multi-antenna transmitting processor 457 and the transmitting processor 468 in FIG. 4 of the present disclosure.

In one embodiment, the first transmitter 1102 comprises the antenna 452, the transmitter 454 and the transmitting processor 468 in FIG. 4 of the present disclosure.

Embodiment 12

Figures 12, 13, 14:
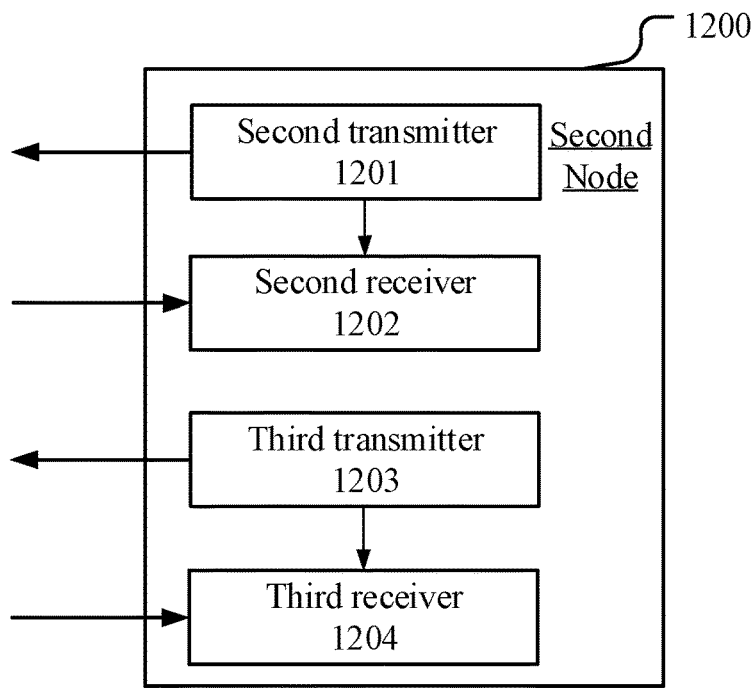
FIG. 12 illustrates a structure block diagram of a processing device in a second node according to one embodiment of the present disclosure.
FIG. 13 illustrates a schematic diagram of message structure of a fourth signal according to one embodiment of the present disclosure.
FIG. 14 illustrates a schematic diagram of message structure of a fifth signal according to one embodiment of the present disclosure.

Embodiment 12 illustrates a structure block diagram of a processing device in a second node according to one embodiment of the present disclosure, as shown in FIG. 12. In FIG. 12, a processing device 1200 in a second node comprises a second transmitter 1201, a second receiver 1202, a third transmitter 1203 and a third receiver 1204.

The second transmitter 1201 transmits a first signal.

The third transmitter 1203 transmits a second signal.

The second receiver 1202 receives a third signal.

In Embodiment 12, the first signal and the second signal respectively comprise a first identity and a second identity, and the first signal and the second signal are both associated with a third identity; the third signal carries the second identity; the first identity is different from the second identity; the third identity is associated with a first cell group, the first cell group comprising K1 cells; a transmitter of the first signal is a first cell, and a transmitter of the second signal is a second cell; both the first cell and the second cell belong to the first cell group; the third signal is used for initiating a handover from the first cell to the second cell.

In one embodiment, the first identity and the second identity are respectively used for generating the first signal and the second signal.

In one embodiment, the third transmitter 1203 transmits a fourth signal; herein, the fourth signal comprises a first information set, and the fourth signal is a broadcast signal, and the first information set remains unchanged during a handover of the first node from the first cell to the second cell.

In one embodiment, the third transmitter 1203 transmits a fifth signal; herein, the fifth signal comprises a second information set, and the fifth signal is a broadcast signal, and the second information set only takes effect after the first node is handed over to the second cell.

In one embodiment, the first signal and the second signal both comprise the third identity.

In one embodiment, when a first condition is fulfilled, the third receiver 1204 receives a sixth signal; herein, a relation between the second identity and the third identity is used for determining the first condition; the sixth signal is used for requesting acquisition of system information of the second cell; the system information comprises the second information set.

In one embodiment, when moving in the first cell group, a receiver of the first signal is in connection to the second node; the K1 cells in the first cell group are generated by the second node.

In one embodiment, the second transmitter 1201 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1201 comprises the antenna 452, the transmitter 454, the multi-antenna transmitting processor 457 and the transmitting processor 468 in FIG. 4 of the present disclosure.

In one embodiment, the second transmitter 1201 comprises the antenna 452, the transmitter 454 and the transmitting processor 468 in FIG. 4 of the present disclosure.

In one embodiment, the second receiver 1202 comprises the antenna 452, the receiver 454, the multi-antenna receiving processor 458, the receiving processor 456, the controller/processor 459, the memory 460 and the data source 467 in FIG. 4 of the present disclosure.

In one embodiment, the second receiver 1202 comprises the antenna 452, the receiver 454, the multi-antenna receiving processor 458 and the receiving processor 456 in FIG. 4 of the present disclosure.

In one embodiment, the second receiver 1202 comprises the antenna 452, the receiver 454 and the receiving processor 456 in FIG. 4 of the present disclosure.

In one embodiment, the third transmitter 1203 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the third transmitter 1203 comprises the antenna 452, the transmitter 454, the multi-antenna transmitting processor 457 and the transmitting processor 468 in FIG. 4 of the present disclosure.

In one embodiment, the third transmitter 1203 comprises the antenna 452, the transmitter 454 and the transmitting processor 468 in FIG. 4 of the present disclosure.

In one embodiment, the third receiver 1204 comprises the antenna 452, the receiver 454, the multi-antenna receiving processor 458, the receiving processor 456, the controller/processor 459, the memory 460 and the data source 467 in FIG. 4 of the present disclosure.

In one embodiment, the third receiver 1204 comprises the antenna 452, the receiver 454, the multi-antenna receiving processor 458 and the receiving processor 456 in FIG. 4 of the present disclosure.

In one embodiment, the third receiver 1204 comprises the antenna 452, the receiver 454 and the receiving processor 456 in FIG. 4 of the present disclosure.

Embodiment 13

Embodiment 13 illustrates a schematic diagram of message structure of a fourth signal according to one embodiment of the present disclosure. In FIG. 13, the --ASNISTART represents a start of an ASN1 message; the --TAG-fourth signal-START represents a start of the fourth signal; the --TAG-fourth signal-STOP represents an end of the fourth signal; the --ASNISTOP represents an end of an ASN1 message; the SEQUENCE{ } represents a struct; and the symbol "..." represents other information; and the symbol ": :=" represents "being defined as".

In one embodiment, the symbol ": :=" also represents "including".

In one embodiment, the message structure of the fourth signal is the same as that of an RRC message in TS 36.331.

In one embodiment, the message structure of the fourth signal is the same as that of an RRC message in TS 38.331.

In one embodiment, the first information set is one or more IEs in the fourth signal.

In one embodiment, the first information set is one or more fields in the fourth signal.

In one embodiment, the fourth information also comprises other information.

In one embodiment, the SEQUENCE{ } comprises multiple data types.

In one embodiment, the fourth information comprises multiple structs of the SEQUENCE{ } type.

Embodiment 14

Embodiment 14 illustrates a schematic diagram of message structure of a fifth signal according to one embodiment of the present disclosure. In FIG. 14, the --ASNISTART represents a start of an ASN1 message; the --TAG-fifth signal-START represents a start of the fifth signal; the --TAG-fifth signal-STOP represents an end of the fifth signal; the --ASNISTOP represents an end of an ASN message; the SEQUENCE{ } represents a struct; and the symbol "..." represents other information; and the symbol ": :=" represents "being defined as".

In one embodiment, the symbol "::=" also represents "including".

In one embodiment, the message structure of the fifth signal is the same as that of an RRC message in TS 36.331.

In one embodiment, the message structure of the fifth signal is the same as that of an RRC message in TS 38.331.

In one embodiment, the second information set is one or more IEs in the fifth signal.

In one embodiment, the second information set is one or more fields in the fifth signal.

In one embodiment, the fifth information also comprises other information.

In one embodiment, the SEQUENCE{ } comprises multiple data types.

In one embodiment, the fifth information comprises multiple structs of the SEQUENCE{ } type.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signal and a second signal; and
a first transmitter, transmitting a third signal; and
the first receiver, receiving a fifth signal; and
the first transmitter, transmitting a sixth signal when a first condition is fulfilled; wherein:
the first signal and the second signal respectively comprise a first identity and a second identity, and the first signal and the second signal are both associated with a third identity;
the first identity comprises a Physical Cell Identity, the second identity comprises a Physical Cell Identity;
the third signal carries the second identity;
the first identity is different from the second identity;
the third identity is associated with a first cell group, the first cell group comprising K1 cells;
the first signal is transmitted in the first cell, and the second signal is transmitted in a second cell;
both the first cell and the second cell belong to the first cell group;
the third signal is used for initiating a handover from the first cell to the second cell;
wherein a relation between the second identity and the third identity is used for determining the first condition; the sixth signal is used for requesting acquisition of system information of the second cell; the system information comprises a second information set;
the fifth signal comprises the second information set, and the fifth signal is a broadcast signal, and the second information set only takes effect after the first node is handed over to the second cell.

2. The first node according to claim 1, wherein the first identity and the second identity are respectively used for generating the first signal and the second signal.

3. The first node according to claim 1, comprising:
the first receiver receiving a fourth signal;
wherein the fourth signal comprises a first information set, and the fourth signal is a broadcast signal, and the first information set remains unchanged during a handover of the first node from the first cell to the second cell.

4. The first node according to claim 1, wherein the first signal and the second signal both comprise the third identity.

5. The first node according to claim 1, wherein when moving in the first cell group, the first node is in connection to a second node; the K1 cells in the first cell group are generated by the second node.

6. The first node according to claim 5, wherein the first cell group corresponds to the K1 beams from the satellite base station covering the given area at different times.

7. A method in a first node for wireless communications, comprising:
receiving a first signal and a second signal;
transmitting a third signal; and
receiving a fifth signal; and
transmitting a sixth signal when a first condition is fulfilled; wherein:
the first signal and the second signal respectively comprise a first identity and a second identity, and the first signal and the second signal are both associated with a third identity;
the first identity comprises a Physical Cell Identity, the second identity comprises a Physical Cell Identity;
the third signal carries the second identity;
the first identity is different from the second identity;
the third identity is associated with a first cell group, the first cell group comprising K1 cells;
the first signal is transmitted in the first cell, and the second signal is transmitted in a second cell;
both the first cell and the second cell belong to the first cell group;
the third signal is used for initiating a handover from the first cell to the second cell;
wherein a relation between the second identity and the third identity is used for determining the first condition; the sixth signal is used for requesting acquisition of system information of the second cell; the system information comprises a second information set;
the fifth signal comprises the second information set, and the fifth signal is a broadcast signal, and the second information set only takes effect after the first node is handed over to the second cell.

8. The method in the first node for wireless communications according to claim 7, wherein the first identity and the second identity are respectively used for generating the first signal and the second signal.

9. The first node according to claim 7, comprising:
receiving a fourth signal;
wherein the fourth signal comprises a first information set, and the fourth signal is a broadcast signal, and the first information set remains unchanged during a handover of the first node from the first cell to the second cell.

10. The method in the first node for wireless communications according to claim 7, wherein the first signal and the second signal both comprise the third identity.

11. The method in the first node for wireless communications according to claim 7, wherein when moving in the first cell group, the first node is in connection to a second node; the K1 cells in the first cell group are generated by the second node.

12. The method in the first node for wireless communications according to claim 11, wherein the first cell group corresponds to the K1 beams from the satellite base station covering the given area at different times.

13. A second node for wireless communications, comprising:
a second transmitter, transmitting a first signal;
a third transmitter, transmitting a second signal; and
a second receiver, receiving a third signal; and
the second transmitter, transmitting a fifth signal; and
the second receiver, receiving a sixth signal; wherein:
the first signal and the second signal respectively comprise a first identity and a second identity, and the first signal and the second signal are both associated with a third identity;
the first identity comprises a Physical Cell Identity, the second identity comprises a Physical Cell Identity;
the third signal carries the second identity;
the first identity is different from the second identity;
the third identity is associated with a first cell group, the first cell group comprising K1 cells;
the first signal is transmitted in the first cell, and the second signal is transmitted in a second cell;
both the first cell and the second cell belong to the first cell group; the third signal is used for initiating a handover from the first cell to the second cell;
wherein a relation between the second identity and the third identity is used for determining the first condition; the sixth signal is used for requesting acquisition of system information of the second cell; the system information comprises a second information set; the sixth signal is transmitted when a first condition is fulfilled;

the fifth signal comprises the second information set, and the fifth signal is a broadcast signal, and the second information set only takes effect after the first node is handed over to the second cell.

14. The second node according to claim 13, comprising:

the third transmitter transmitting a fourth signal;

wherein the fourth signal comprises a first information set, and the fourth signal is a broadcast signal, and the first information set remains unchanged during a handover of the first node from the first cell to the second cell.

15. The second node according to claim 13, comprising:

the third receiver receiving a sixth signal when a first condition is fulfilled;

wherein a relation between the second identity and the third identity is used for determining the first condition; the sixth signal is used for requesting acquisition of system information of the second cell; the system information comprises the second information set.

16. The first node according to claim 3, wherein the second information set comprises the second identity; and the second information set comprises frequency configuration information.

17. The method in the first node for wireless communications according to claim 9, wherein the second information set comprises the second identity; and the second information set comprises frequency configuration information.

* * * * *